May 30, 1967 — L. G. SIMJIAN — 3,322,113
COOKING VESSEL
Filed Nov. 13, 1964

LUTHER G. SIMJIAN
INVENTOR.

United States Patent Office 3,322,113
Patented May 30, 1967

3,322,113
COOKING VESSEL
Luther G. Simjian, Laurel Lane,
Greenwich, Conn. 06830
Filed Nov. 13, 1964, Ser. No. 411,037
4 Claims. (Cl. 126—390)

This invention refers to a novel cooking appliance and, more specifically, has reference to an improved cooking pot or pan. Quite specifically, this invention concerns a cooking pot or pan which is provided with means to improve the contact and heat transfer between the article to be cooked and the heated surface with which the article is in contact.

Standard cooking or frying appliances are provided with substantially rigid and relatively inflexible bottom surfaces on which an article to be cooked or fried is supported. When cooking pieces of meat for instance, which have an irregular surface, such as a lamb chop, it is well known that the areas in direct contact with the pan become charred due to the intimate and lengthy contact with the heated surface, while the remaining areas remain cooked to a much lesser degree. Hence, the entire cooked piece lacks uniform flavor and appearance. As is well known by those practicing cooking in a professional manner, more uniform cooking is achieved by the use of a rather generous amount of oil, butter, fat, etc. which lines the bottom of the pan. This additive acts as a filler between the irregular contours of the article of food and the bottom panel of the pan and transmits the heat in a more uniform manner to the entire surface of the article which is being prepared.

The dietary trend away from fatty substances seeks to avoid the use of the high calorie substances indicated hereinabove and attempts to prepare the food without any foreign substances acting as lubricant or filler. To this end, tetrafluoroethylene coated pans, better known under the trade name "Teflon" coated, have come into use which permit the preparation of food without fat and without the food becoming burned on the pan. This is possible since the "Teflon" or similar chemical substances have what are known as high release properties, that is, exhibiting relatively little surface adhesion with other substances. Silicone coated material is another example of a surface having high release properties.

Yet, these coated bottom panels fail to provide for the uniform preparation and cooking of articles of food, particularly when the articles have irregular contours since the panels are rigid and the transfer of heat is achieved to the article through limited areas of contact at which the article tends to become overcooked, while on other areas the article lacks proper cooking, caused by insufficient heat transfer.

In order to overcome this shortcoming and to provide an improved cooking appliance, I have devised a cooking appliance or pan which is provided with a flexible diaphragm mounted in spaced relationship from the bottom panel and the space between the diaphragm and the bottom panel is filled with a heat conductive, deformable filler medium. Thus, the diaphragm is capable of assuming a shape corresponding to the contours of the article supported thereon, and heat applied to the bottom panel of the cooking appliance is transmitted via the filler medium to the diaphragm from which the heat is uniformly applied and transferred to the surface of the article. Hence, a more uniform cooking, flavoring, and preparation of the article is achieved.

One of the principal objects of this invention is, therefore, the provision of a novel and improved cooking appliance.

Another object of this invention is the provision of a flexible diaphragm upon which an article to be cooked is supported, the diaphragm being capable to assume a shape which corresponds to the irregular surfaces of the article in contact with the diaphragm.

Still another object of this invention is the provision of a cooking appliance or pan having a bottom panel, a spaced flexible diaphragm, and a filler of deformable material filling the space between the bottom panel and the diaphragm.

A further object of this invention is the provision of a cooking appliance or pan having a bottom panel, a filler medium of deformable material superposed thereupon, and a flexible diaphragm supported upon the filler medium, the diaphragm serving as the actual cooking surface.

A further and another object of this invention is the provision of a cooking appliance having a flexible diaphragm which serves as the cooking surface, the diaphragm surface having high release properties in order to prevent sticking and burning of the article of food supported thereon.

Still further and other objects of this invention will be more clearly apparent by reference to the following description when taken in conjunction with the accompanying drawings in which.

Figure 1:
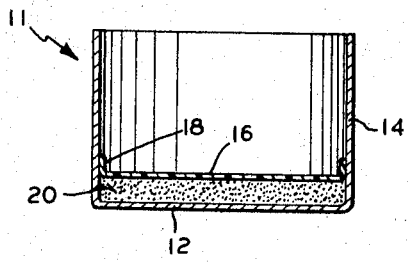
FIGURE 1 is a vertical sectional view of the new cooking appliance.

Referring now to the figures and FIGURE 1 in particular, numeral 11 identifies the novel cooking appliance which comprises a conventional bottom panel 12 and upstanding side surfaces 14 for defining generally a vessel. In accordance with my invention, there is disposed a flexible, deformable diaphragm 16 spaced from the bottom panel and the space between the bottom panel 12 and the diaphragm 16 is filed with a deformable and yieldable heat transmitting filler medium, such as a liquid, granular sand, silica granules, and the like. The underside of the diaphragm 16 is supported by the filler medium 20. The diaphragm is sealed or merged into the side surface 14 at a joint 18. The diaphragm 16 is made from a flexible, readily yieldable or distortable, material so that it yields under the influence of the article resting thereupon. The diaphragm 16 will follow the irregular contours of the article as will the filler medium 20, in a manner which is similar to a mold or plaster cast impression. The diaphragm 16 may be a relatively thin metallic foil coated on its surface with a material having high release properties, but in the preferred embodiment, it is a diaphragm of thin "Teflon" sheet material sufficiently flexible to follow the contours of the article. In this way the articles can be cooked without the use of fat or similar foreign and non-desired substances. Heat applied to the underside of the bottom panel 12 is transferred to the distortable filler medium 20, such as granular material, sand or quartz, or a liquid, such as water, or a solid material which under the influence of heat becomes plastic or liquid, e.g. tin. The filler medium, in turn, transfers the heat imparted thereto to the diaphragm which forms the cooking surface.

Figure 2:
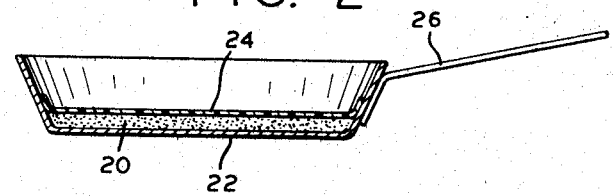
FIGURE 2 is a vertical section through a cooking pan illustrating my invention.

FIGURE 2 shows a pan in accordance with this invention, comprising a bottom panel 22, a spaced diaphragm 24 and a filler medium 20. A handle 26 is attached to the side of the pan in the conventional manner.

Figure 3:
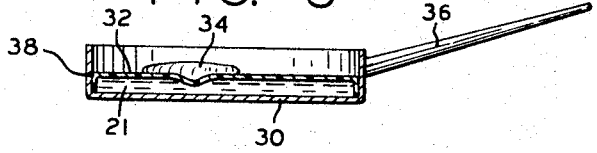
FIGURE 3 is a vertical section of an alternative arrangement.

FIGURE 3 illustrates a slightly different construction. While in FIGURES 1 and 2 the edge of the diaphragm is turned up and sealed to the side surface, in FIGURE 3 the edge or rim is turned down and sealed at the area indicated by numeral 38. In this example a liquid filler 21, for instance water, which may be superheated due to its being sealed in, is disposed between the bottom panel 30 and the diaphragm 32. A handle 36 is attached to the pan structure. Article 34 is supported on the diaphragm 32 and, in turn, by the filler medium 21. As clearly seen, the underside of the article 34 has an irregularly shaped underside and the filler medium and the diaphragm have flexed and yielded to provide intimate contact with the contours of the article underside. Thus, improved heat transfer to the article 34 is achieved, causing it to be cooked more uniformly than is possible with a rigid, inflexible cooking surface.

Figure 4:
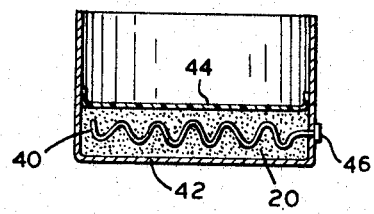
FIGURE 4 is a vertical cross sectional view of another cooking appliance incorporating my invention as designed primarily for electrical heating.

In FIGURE 4 an electrical heating coil is embedded in the filler medium 20, both disposed between the bottom panel 42 and the flexible diaphragm 44. The heating coil is terminated at a socket 46.

Figure 5:
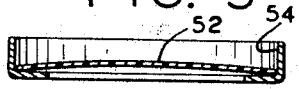
FIGURE 5 is a sectional view of the diaphragm.
Figure 6:
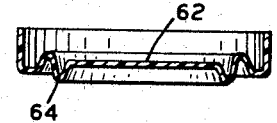
FIGURE 6 is a sectional view of another embodiment of the diaphragm.

Typical constructions of the diaphragm are shown in FIGURES 5 and 6. In FIGURE 5 a flexible diaphragm 52 is sealed to an annular L-shaped rim 54 which provides a welded seal with the inner side surface of the cooking appliance. In order to provide the desired flexibility, the diaphragm is slightly bowed. In FIGURE 6, the diaphragm 62 is one piece, molded of "Teflon" material or similar substance. An annular bellows type convolution 64 imparts flexibility to the diaphragm. It will be apparent that other configurations may be used as well.

Figure 7:
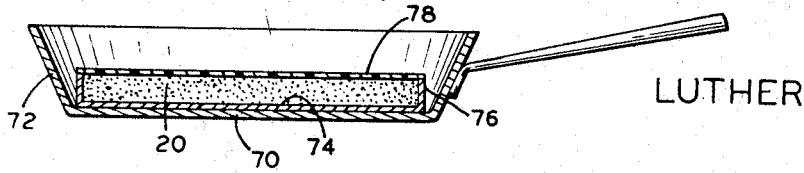
FIGURE 7 is a vertical sectional view of a variation of the instant invention.

FIGURE 7 illustrates a removable insert constructed in accordance with my invention for use in standard and previously available cooking utensils and appliances. Numerals 70 and 72 define respectively the bottom surface and the side walls of a regular pan. This pan is provided with a removable insert comprising a bottom panel 74, side walls 76 and a flexible diaphragm 78. The diaphragm 78 is of a construction as described hereinbefore. The bottom panel 74 may be rigid metal or a semi-flexible or flexible sheet of soft aluminum or copper or other suitable medium adapted to receive the heat from the pan bottom surface 70. The space between the panel 74 and the diaphragm 78 is filled with the filler medium 20 as described above. The construction as shown in FIGURE 7 therefore, forms a self-contained unit which readily may be inserted and removed from a standard cooking pan, pot or other open container.

When cooking foods which are inherently flexible or flow in liquid form, such as eggs for instance, the flexibility of the diaphragm becomes a minor consideration as the article adjusts itself to the contours of the diaphragm instead of vice versa. Even in this case, the cooking appliance hereinbefore disclosed provides considerably improved results since the removal of the cooking surface from direct contact with the usual intense source of heat causes a more uniform temperature all over the diaphragm. Hence, the article of food will be cooked evenly and uniformly. The Teflon coating of the top surface, as described above, provides the desired non-sticky cooking surface.

While there have been described and illustrated various preferred embodiments of my invention, including certain specific variations thereof, it will be apparent to those skilled in the art that various further and other modifications may be made therein without deviating from the broad principles and intent of this invention which shall be limited only by the scope of the appended claims.

What is claimed is:
1. A cooking appliance having in combination:
 a bottom panel and upstanding side surface extending therefrom;
 a flexible diaphragm made entirely of Teflon sheet material spaced from said bottom panel;
 a heat conducting deformable filter medium filling the space between said bottom panel and said diaphragm, and
 said diaphragm being sufficiently thin and compliant to follow substantially the contours of an article supported thereupon.
2. A cooking appliance as set forth in claim 1 wherein said filler medium is deformable at normal room temperature.
3. A cooking appliance as set forth in claim 1 wherein said diaphragm is provided with a convolution to enhance the flexibility thereof.
4. A cooking appliance as set forth in claim 1 wherein said filler medium is granular material.

References Cited

UNITED STATES PATENTS

| | | | |
|---|---|---|---|
| 963,892 | 7/1910 | Haskins | 219—540 |
| 2,174,425 | 9/1939 | Schlumbohm | 126—390 X |
| 3,008,601 | 11/1961 | Cahne | 126—390 X |
| 3,038,058 | 6/1962 | Gordon | 126—400 X |
| 3,083,286 | 3/1963 | Swetlitz | 219—426 X |
| 3,132,688 | 5/1964 | Nowak | 126—400 X |

FREDERICK L. MATTESON, JR., *Primary Examiner.*

ROBERT A. DUA, *Assistant Examiner.*